United States Patent [19]
Thomas

[11] Patent Number: 5,248,454
[45] Date of Patent: Sep. 28, 1993

[54] ALGAE RESISTANT EDGE COATING

[75] Inventor: Patricia T. Thomas, North Fort Myers, Fla.

[73] Assignee: Munters Corporation, Fort Myers, Fla.

[21] Appl. No.: 866,492

[22] Filed: Apr. 10, 1992

[51] Int. Cl.⁵ ............................................. B01F 3/04
[52] U.S. Cl. ........................ 261/112.2; 261/DIG. 46
[58] Field of Search ................... 261/112.2, DIG. 46

[56] References Cited

U.S. PATENT DOCUMENTS

| | | | |
|---|---|---|---|
| 3,286,999 | 11/1966 | Takeda | 261/112.2 |
| 3,395,903 | 8/1968 | Norback et al. | 261/112.2 |
| 3,500,615 | 3/1970 | Meek | 261/112.2 |
| 3,862,280 | 1/1975 | Polovina | 261/112.2 |
| 4,561,981 | 12/1985 | Characklis | 261/DIG. 46 |

Primary Examiner—Tim Miles
Attorney, Agent, or Firm—Fitzpatrick, Cella, Harper & Scinto

[57] ABSTRACT

A gas-liquid contact body for use in a gas-liquid contact apparatus is disclosed which is formed of a plurality of facially opposed corrugated sheets with the corrugations in alternate sheets being disposed in parallel to form a plurality of criss-crossing channels for gas and liquid. The contact body has an air inlet side including an air inlet portion which is coated with a water-impermeable hydrophilic material containing an algicide.

7 Claims, 2 Drawing Sheets

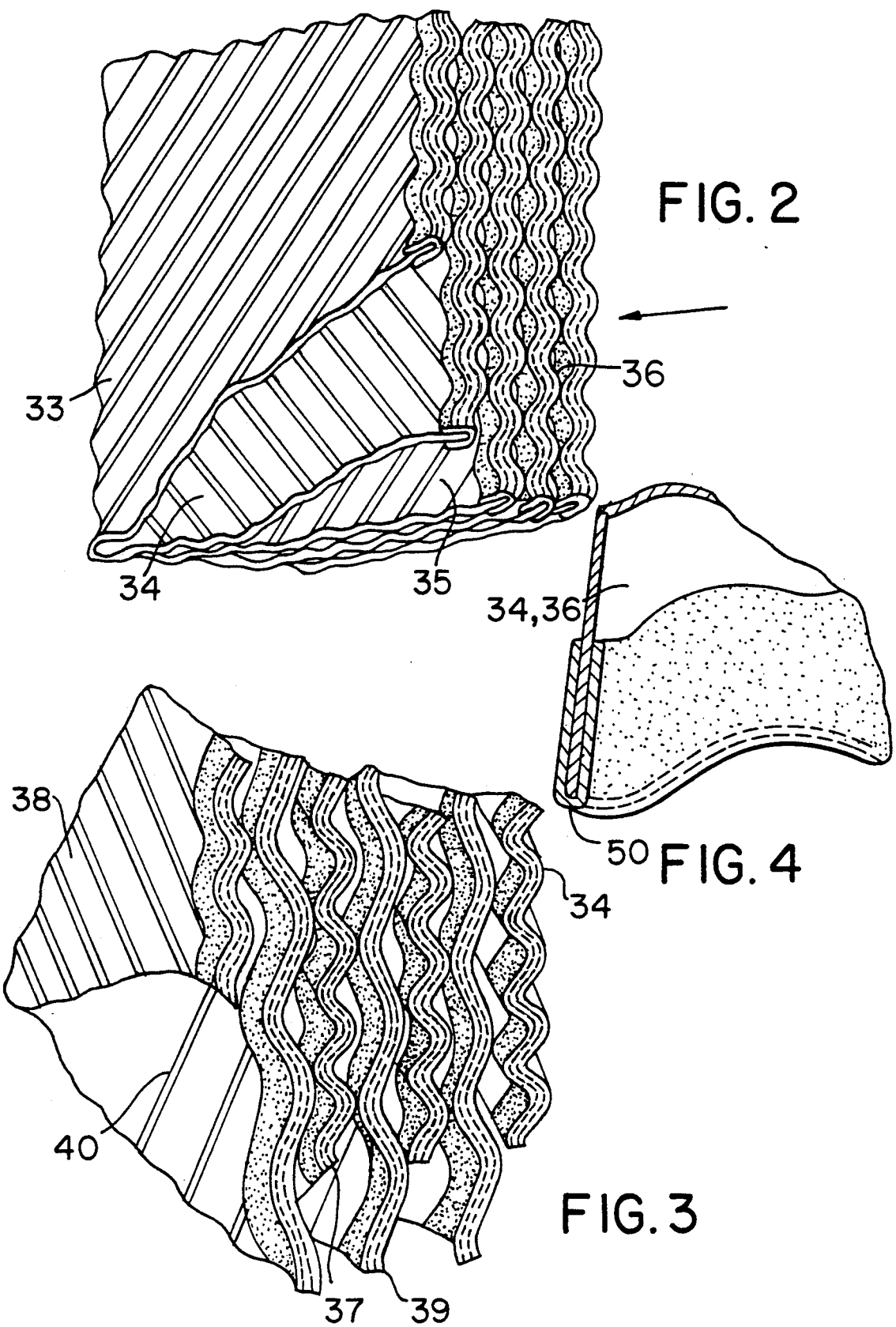

ALGAE RESISTANT EDGE COATING

The present invention relates to contact bodies for evaporative cooling apparatus and the like.

Cooling towers and evaporate coolers or the like remove heat from water by causing water to gravitate through a fill assembly in heat exchange relationship with currents of air. As a result the temperature of the water is lowered by the surface evaporation of the water before being returned to the equipment employing the water for various thermal interchange functions.

It has been well known to form contact bodies for use in these apparatus from a plurality of sheets of corrugated materials defining a plurality of channels or ducts in the contact body through which gas and liquid are passed. One such well known contact body is disclosed for example in U.S. Pat. No. 3,500,615. Such contact bodies are formed from a range of materials including Kraft paper, fiberglass, plastic, and other materials including impregnated materials as shown for example in U.S. Pat. No. 3,862,280.

Gas contact bodies of this type have distinct advantages in cooling towers and evaporative cooling apparatus. Among the few disadvantages are that such contact bodies also serve as excellent air filters and breeding grounds for algae. This is particularly true along the air inlet side of the contact body which encounters the most dirt and atmospheric impurities, and is also exposed to sunlight. Accordingly, this portion of the contact body is subject to contamination and clogging as a result of dust and dirt entering the contact body.

To combat this problem and to remove the dust and dirt filtered from the air, it has previously been proposed to flush the contact body with copious amounts of water. If this is not done and the debris is allowed to dry on the substrate of the contact body (particularly if it is a porous substrate such as kraft paper fiberglass or cotton) the dust, dirt, spores and minerals captured by the contact body will deposit and solidify throughout the fibers of the contact body sheets. These deposits then are difficult to remove without destroying the fiber substrate. If left unattended, the air entering face of the media eventually may be completely clogged.

In addition to contamination from dirt and other airborne impurities, it has been found that algae will form at the interface between the wetted contact media and the sunlight, typically on the inlet side but also possibly on the outlet side of the contact body. Given the construction of the typical evaporative cooling apparatus, it is the first one-quarter to one inch of the channels of the media which will be exposed to sunlight and subject to the proliferation of algae in the presence of that light, nutrients and moisture.

It is an object of the present invention to provide a contact body for cooling towers and evaporative coolers which has improved operating efficiencies.

Another object of the present invention is to provide a contact body which has a self-cleaning air inlet and/or air outlet edge portion.

Another object of the present invention is to provide a contact body which has an edge portion which will resist the deposition and proliferation of algae.

In accordance with an aspect of the present invention, a gas liquid contact body is provided for use in a gas liquid contact apparatus having a casing, in a gas inlet side and a gas outlet side. The contact body is formed of a plurality of corrugated sheets disposed in facially opposed relationship to one another and in substantially parallel relationship to one another in alternate sheets. The contact body defines a gas inlet edge adapted to be positioned adjacent to the ga inlet side of the casing.

The sheets of the contact body define a plurality of intersecting and inter-communicating passages allowing the passage of gas and liquid therethrough. The corrugations in each of the sheets extend at an angle to the main direction of flow of gas through the contact body, with the corrugations and alternate strips being disposed at an angle to the corrugations in the strips disposed between the alternate strips. The gas inlet edge of the contact body is coated with a water impermeable hydrophilic material containing an algicide.

The above, and other objects, features and advantages of this invention will be apparent in the following detailed description of an illustrative embodiment thereof, which is to be read in connection with the accompanying drawings, wherein:

FIG. 2 is a perspective view, partly in section, of a contact body constructed in accordance with the present invention and adapted to be used in the tower of FIG. 1;

FIG. 3 is a fragmentary enlarged view of the air inlet edge portion of the contact body of FIG. 2; and FIG. 4 is a further enlarged view of the edge of the air inlet portion of the single sheet of the contact body.

Figure 1:
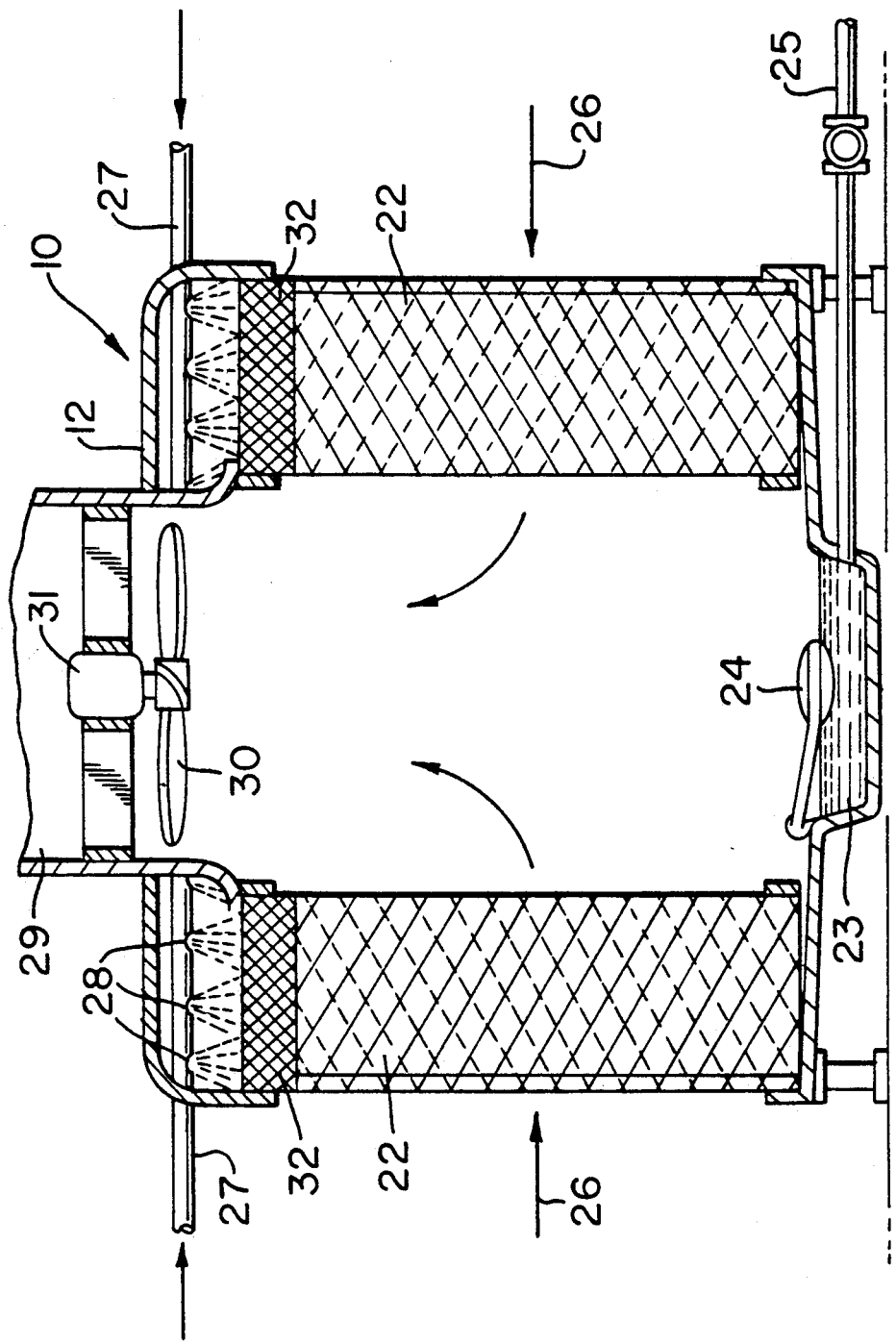
FIG. 1 is a vertical longitudinal sectional view of one embodiment of a cooling tower adapted to contain contact bodies constructed in accordance with the present invention.

Referring now to the drawings in detail, and initially to FIG. 1 thereof, a cooling tower 10 includes a casing 12 in which one or more contact bodies 22 constructed in accordance with the present invention are mounted. The base of casing 12 is formed into a sump 23 having a float 24 and drainage line 25. Gas, such as air, enters the channels or ducts within the contact bodies at the air inlet edge portion 26 thereof and is drawn upwardly, within the apparatus, to an outlet 29 equipped with a fan 30 and motor 31. Liquid, such as water, is introduced into the evaporative cooling apparatus or cooling tower through a liquid supply line 27 and escapes from the line through perforations or nozzles 28 or the like in the well known manner. The liquid escaping from the supply line 28 passes through a distribution pad 32 of conventional construction into the top of the contact bodies 22.

Contact body 22 in accordance with the present inventions is illustrated in greater detail in FIGS. 2 and 3. The body consists of a plurality of corrugated sheets 33, 34, 35, 36 with the corrugations in adjacent sheets, e.g. 33 and 34, being disposed at an angle to each other and the corrugations in alternate sheets, such as 33, 35, being disposed in parallel, whereby a plurality of criss-crossing passages ar formed within the contact body. Preferably the sheets are positioned at unequal angles to each other as is known in the art.

As seen in FIG. 1, when the contact bodies are mounted in the evaporative cooling apparatus, the corrugations are generally at an angle relative to the horizontal so as to permit the gravity flow of liquid there through. The particular angular relationship of the sheets to one another, and to the horizontal, may be varied from apparatus to apparatus depending upon the particular construction to be achieved or function to be performed thereby.

Typically, the corrugations and the corrugated sheets have a height or amplitude up from 5 to 40 or 60 millimeters and a width of 10 to 30 millimeters. The corrugated sheets may be adhered to one another at points of contact within the contact body or may be held in a fixed position by suitable spacing and retaining means at their edges.

Contact bodies having the general construction illustrated in FIGS. 2 and 3 have been formed from a variety of materials including corrugated plastic sheets or sheets of fibrous, woven or non-woven material, such as for example glass, Kraft paper, or cotton. Such fibrous materials have been impregnated with resins, as for example is discussed in U.S. Pat. No. 3,862,280 in order to provide a degree or rigidity and wet strength. As is noted above, the contact body tends to collect dirt and dust passing through it with the air. At the edge of the contact bodies algae growth is encouraged by the exposure to sunlight, moisture and nutrients contained in the air and water passing over the contact body.

In accordance with the present invention, this problem with previously proposed contact bodies is overcome by the provision of a protective layer on at least the air inlet edge of the evaporative cooling media which will prevent deposition and absorption of solids and nutrients onto the substrate. By providing a protective surface which also dries out as soon as the water is turned off, algae growth is prevented.

More in particular, the air inlet edges of each of the sheets of corrugated material is coated with a water resistant, water impermeable material 50 which is hydrophilic. This feature of the material causes the water passing through the contact body to spread out on the surface of the coating into a thin film which continuously washes the edge of the contact body to remove dirt, spores, and other contamination therefrom. When the water is turned off, the edge dries immediately. Thus, it will not retain water which would otherwise sustain algae growth. Accordingly, the edge of the contact body is protected while the reminder of the contact body, which is not subject to the collection of dirt or the exposure of sunlight, function in its usual way.

It has been found that a protective layer composed of acrylic, rubber or plastic base material applied to the edge of the contact body in a thickness of about 1 to 3 mils and for a depth of between ¼ and 1 inch adequately protects the contact body. The coating thickness insures coating of the porous fibers of the body.

As noted, the coating used in accordance with the present invention does not retain water because it is water impermeable. Therefore, it dries out completely when water stops being distributed through the contact body. Heretofore the porous substrate at the edge portion of the contact body would retain water for many hours and sustain algae growth. Moreover, algae spores will not adhere to the coating because it is smooth and will not allow the algae to embed itself in the fibers of the substrate. Furthermore, algae spores which fall onto the edge are washed away with the water or moved into the contact body where they cannot be exposed to the sunlight. The coating also provides ultra violet protection to the edge portions of the sheet.

It has been found that a preferred coating for this purpose can be formulated as follows:

Latex rubber, acrylic or plastic (i.e. PVC) 65–70 parts;
Kaolin or hydrated alumina 25–30 parts;
Titanium dioxide or carbon black 1–5 parts;
Silicone 0.001 to 1 part;
Copper or quaternary ammonia salts 0.001 to 1 part.

Although an illustrative embodiment of the present invention described herein with reference to the accompanying drawings, it is to be understood that the invention is not limited to that precise embodiment and that various changes and modifications may be effected therein by one skilled in the art without departing from the scope or spirit of this invention.

I claim:

1. A gas-liquid contact body for use in a gas-liquid contact apparatus, said contact body comprising a plurality of facially opposed corrugated sheets with the corrugations in alternate sheets being disposed in parallel to form a plurality of criss-crossing channels for gas and liquid, said contact body having an air inlet side including an air inlet edge portion, and an air outlet side including an air outlet edge portion, one or both of said air inlet edge portion and said air outlet edge portion being coated with a water-impermeable hydrophilic material containing a substance having algicide activity which comprises copper or quaternary ammonia salts.

2. A gas-liquid contact body as defined in claim 1, wherein said coating on said edge portion or portions extends inwardly from said air inlet or outlet side or a distance of between 0.25 to 1 inch.

3. A gas liquid contact body as defined in claim 2 wherein said coating is between 1 to 3 mils thick.

4. A gas-liquid contact body for use in a gas and liquid contact apparatus having a casing, a gas inlet side and a gas outlet side, said contact body comprising a plurality of corrugated sheets disposed in facially opposed relationship to one another and in substantially parallel relationship to one another and defining a gas inlet edge adapted to be positioned adjacent said gas inlet side of a casing, and further defining a gas outlet edge adapted to be positioned adjacent said gas outlet side of a casing, and a plurality of intersecting and intercommunicating passages allowing the passage of gas and liquid therethrough, the corrugations in each of said sheets extending at an angle to the main section of flow of the gas through the body with the corrugations in alternate strips being disposed at an angle to the corrugations in the adjacent strips, said gas inlet and or outlet edges being coated with a water-impermeable hydrophilic material containing a substance having algicide activity which comprises copper or quaternary ammonia slats.

5. A gas liquid contact body as defined in claim 4 wherein said coating includes silicone, carbon black, kaolin or hydrated alumina and a material selected from the group consisting of latex rubber, acrylic or plastic.

6. A gas-liquid contact body as defined in claim 4, wherein said containing on said edge portion or portions extends inwardly from said air inlet or outlet side for a distance of between 0.25 to 1 inch.

7. A gas liquid contact body as defined in claim 6 wherein said containing is between 1 to 3 mils thick.

* * * * *